UNITED STATES PATENT OFFICE.

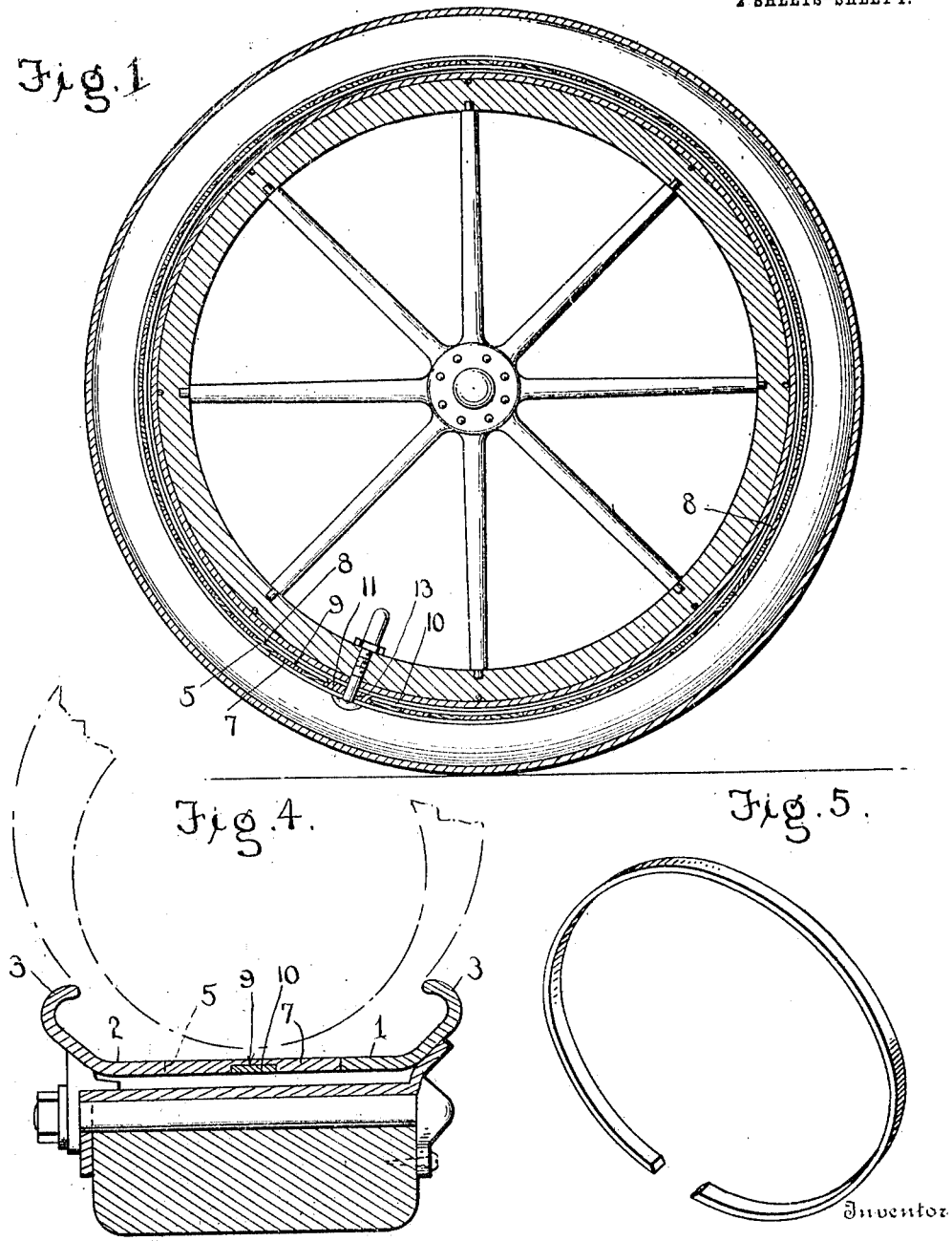

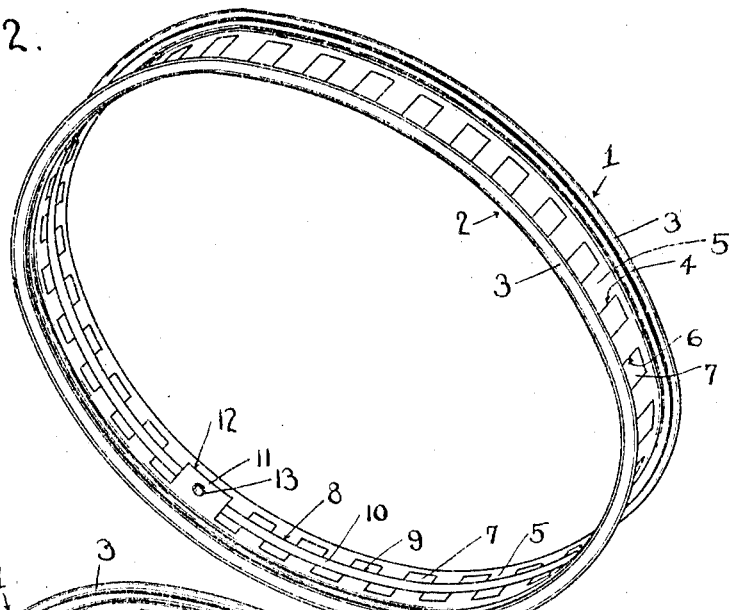
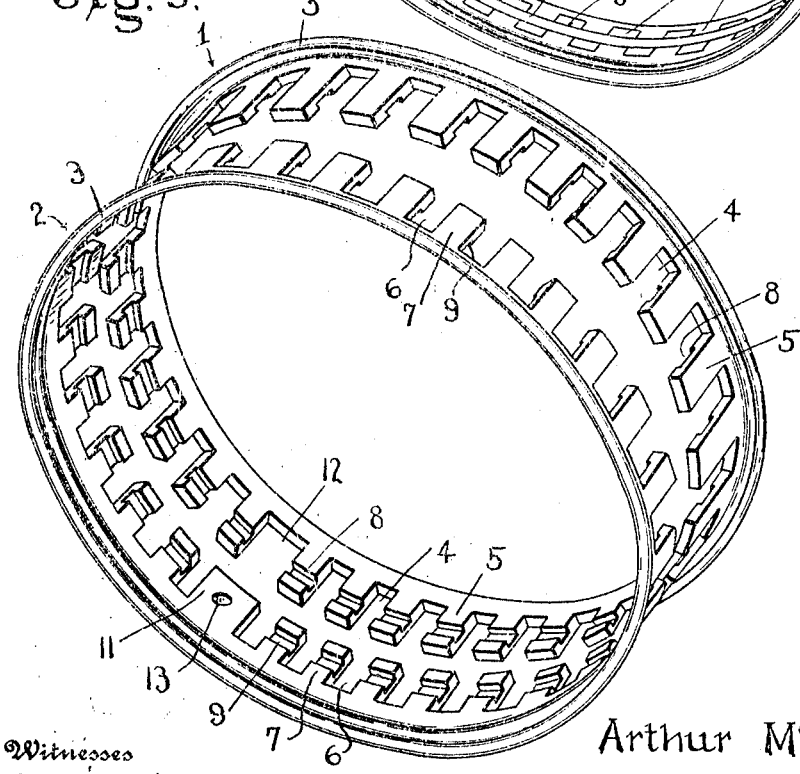

ARTHUR McPHERSON, OF BEAUMONT, TEXAS.

DEMOUNTABLE RIM.

1,073,506.  Specification of Letters Patent.   Patented Sept. 16, 1913.

Application filed November 25, 1912. Serial No. 733,486.

*To all whom it may concern:*

Be it known that I, ARTHUR MCPHERSON, a citizen of the United States, residing at Beaumont, in the county of Jefferson and State of Texas, have invented certain new and useful Improvements in Demountable Rims; and I do declare the following to be a full, clear, and exact description of the invention, such as will enable others skilled in the art to which it appertains to make and use the same.

This invention relates to demountable rims for vehicle wheels.

One object of the invention is to provide a rim of this character formed in separable sections and having an improved means for detachably connecting the sections whereby they may be readily separated for removal from or application to a tire without danger of injuring the latter.

Another object is to provide a rim of this character which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings: Figure 1 is a vertical sectional view through the felly and rim of a wheel and through my improved rim and the tire held thereby on the wheel; Fig. 2 is a perspective view of the rim removed from the wheel showing the sections thereof in operative engagement; Fig. 3 is a similar view showing the sections separated as when being removed from or engaged with a tire; Fig. 4 is an enlarged cross sectional view through the felly of a wheel and through my improved rim illustrating one way in which the rim may be fastened to the wheel; Fig. 5 is a detail perspective view of the locking ring for fastening the two sections of the rim together.

My improved demountable rim is constructed in two sections 1 and 2 each of which is in the form of an annular band having on its outer edge a tire gripping flange 3. The inner edge of the band or section 1 has formed therein series of inwardly extending rectangular notches 4 which are spaced equal distances apart around the band and form an annular series of lugs 5. In the inner edge of the band or section 2 are also formed an annular series of notches 6 corresponding to the notches 4 and forming an annular series of equally spaced lugs 7. The lugs 7 of the section 2 are disposed opposite to the notches 4 in the section 1 while the notches 6 in the section 2 are disposed opposite the lugs 5 of the section 1 whereby when the sections are brought together in operative engagement, said lugs and notches will fit into each other and form an interlocking connection between the two sections or bands of the rim.

In the inner sides of the lugs 5 of the section 1 are formed rectangular recesses 8 while in the lugs 7 of the section 2 are formed similar recesses 9. When the sections 1 and 2 are brought together in operative engagement the notches 8 and 9 in the lugs 5 and 7 will be in longitudinal alinement and with said alined notches is adapted to be engaged a locking ring 10 whereby the sections of the rim are securely locked together in operative engagement with the inner side of the tire. The locking ring 10 is of somewhat less diameter than the diameter of the recess formed by the notches 8 and 9 with which the ring is engaged and said ring is adapted to be expanded or sprung outwardly into engagement with the recess formed by said notches and is held in operative engagement with the recess by a lug 11 formed on the inner edge of the section 2 and which is adapted to be engaged with a notch 12 in the adjacent edge of the section 1 between two of the lugs 5 thereon, said lug 11 thus forming a stop with which the ends of the locking ring 10 are engaged and which holds said ring expanded and in operative engagement with the notches in the lugs 5 and 7 of the rim sections. In the lug 11 is preferably formed an aperture 13 through which the inflating tube and valve of the tire projects.

By constructing my improved rim in the manner described it will be seen that the same may be readily applied to the inner side of a tire by simply bringing the sections of the rim together in interlocking engagement and applying the locking ring thereto in the manner described. In removing the rim from the tire it is simply necessary to disengage the locking ring 10 and to slip the sections of the rim laterally from the opposite sides of the tire thus removing or disengaging the rim without imparting any friction or to otherwise injuring the inner surface of the tire.

In practice it is intended that the rims shall be applied to the tires in the manner described and the latter inflated and kept in engagement with the rims until needed at which time the tire and rim may be readily engaged with a wheel or take the place of the tire removed therefrom. Any suitable means may be employed for fastening the rim and tire to the wheel one form of fastening being shown in Fig. 4 of the drawings, but as the same forms no part of the present invention a description thereof is not thought to be necessary.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A demountable rim comprising a pair of rim sections each provided with a tire engaging member on one edge, the other edge being notched to form spaced fingers, the fingers of one section fitting in the notches of the other section, said fingers having longitudinally alined recesses on their inner faces to form an annular channel when the sections are assembled, a resilient split locking ring adapted to fit in said channel, said ring being of less diameter than the diameter of said channel, a lug formed on the inner edge of one rim section and the other rim section having a notch to receive said lug, said lug extending across the channel in the fingers and forming a stop for engagement by the ends of said locking ring, whereby said ring is held in expanded operative engagement in said channel.

In testimony whereof I have hereunto set my hand in presence of two subscribing witnesses.

ARTHUR McPHERSON.

Witnesses:
  W. M. CROOK,
  MARION COALE.